(12) United States Patent
Balakrishnan et al.

(10) Patent No.: US 6,212,079 B1
(45) Date of Patent: Apr. 3, 2001

(54) METHOD AND APPARATUS FOR IMPROVING EFFICIENCY IN A SWITCHING REGULATOR AT LIGHT LOADS

(75) Inventors: Balu Balakrishnan; Alex B. Djenguerian, both of Saratoga, CA (US)

(73) Assignee: Power Integrations, Inc., Sunnyvale, CA (US)

( * ) Notice: Subject to any disclaimer, the term of this patent is extended or adjusted under 35 U.S.C. 154(b) by 0 days.

(21) Appl. No.: 09/608,161

(22) Filed: Jun. 30, 2000

(51) Int. Cl.$^7$ .............................. H02M 3/335; G05F 1/56
(52) U.S. Cl. ............................. 363/21; 363/97; 323/284
(58) Field of Search .................................. 363/20, 21, 97, 363/131; 323/282, 283, 284, 285

(56) References Cited

U.S. PATENT DOCUMENTS

| | | | |
|---|---|---|---|
| 3,909,695 | * | 9/1975 | Peck ........................................ 363/25 |
| 4,459,651 | * | 7/1984 | Fenter ..................................... 363/21 |
| 4,460,951 | * | 7/1984 | Fenter et al. ............................. 363/49 |
| 4,849,869 | * | 7/1989 | Tanuma et al. .......................... 363/21 |
| 5,430,633 | * | 7/1995 | Smith ..................................... 363/20 |
| 5,747,977 | * | 5/1998 | Hwang ................................... 323/284 |
| 5,912,552 | * | 6/1999 | Tateishi .................................. 323/285 |

* cited by examiner

*Primary Examiner*—Adolf Deneke Bethane
(74) *Attorney, Agent, or Firm*—Blakely, Sokoloff, Taylor & Zafman, LLP

(57) ABSTRACT

A switching regulator that operates at a frequency for a first range of feedback signal values and at a variable frequency without skipping cycles for a second range of feedback signal values. In one embodiment, a switching regulator for a switched mode power supply includes a power switch coupled between drain and source terminals of the switching regulator, which are to be coupled to control the delivery of power to an output of a power supply. A control terminal of the switching regulator is to be coupled to an output of the power supply. The switching regulator includes a control circuit coupled to the control terminal and generates a feedback signal that is responsive to the output of the power supply. The control circuit also generates a drive signal that is coupled to control the switching of the power switch. The control circuit generates the drive signal responsive to the feedback signal. The drive signal has a fixed frequency for a first range of feedback signal values and at a variable frequency without skipping cycles for a second range of feedback signal values.

29 Claims, 4 Drawing Sheets

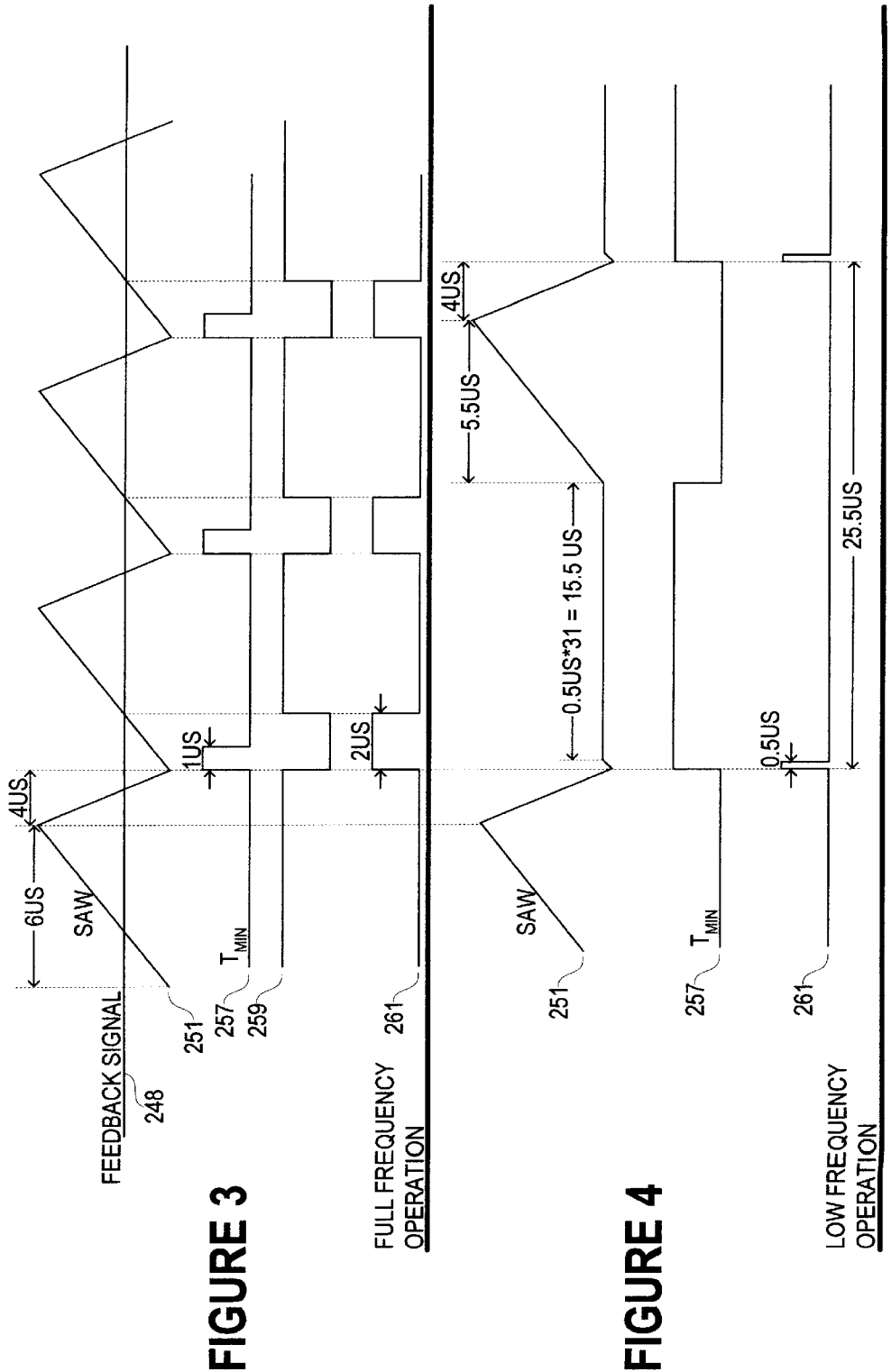

METHOD AND APPARATUS FOR IMPROVING EFFICIENCY IN A SWITCHING REGULATOR AT LIGHT LOADS

BACKGROUND OF THE INVENTION

1. Field of the Invention

The present invention relates generally to power supplies and, more specifically, the present invention relates to a switching regulator.

2. Background Information

Electronic devices use power to operate. Switched mode power supplies are commonly used due to their high efficiency and good output regulation to power many of today's electronic devices. In a known switched mode power supply, a low frequency (e.g. 50 or 60 Hz mains frequency), high voltage alternating current (AC) is converted to high frequency (e.g. 30 to 300 kHz) AC, using a switched mode power supply control circuit. This high frequency, high voltage AC is applied to a transformer to transform the voltage, usually to a lower voltage, and to provide safety isolation. The output of the transformer is rectified to provide a regulated DC output, which may be used to power an electronic device. The switched mode power supply control circuit usually provides output regulation by sensing the output and controlling it in a closed loop.

A switched mode power supply may include an integrated circuit switching regulator, which may include an output transistor coupled in series with a primary winding of the transformer. Energy is transferred to a secondary winding of the transformer by turning on and off of the output transistor in a manner controlled by the switching regulator to provide a clean and steady source of power at the DC output. The transformer of a switched mode power supply may also include another winding called a bias or feedback winding. In some switched mode power supplies, the feedback or control signal can come through an opto-coupler from a sense circuit coupled to the DC output. The feedback control signal may be used to modulate a duty cycle of a switching waveform generated by the switching regulator. The duty cycle is defined as the ratio of the on time to the switching period of the output transistor. If there is a large load at the DC output of the power supply, the switching regulator responds to this situation by increasing the duty cycle and thereby delivering more power to the load. If the load becomes lighter, then the switching regulator senses this change through the feedback signal and reduces the duty cycle.

If the load is further reduced and if the power delivered to the DC output cannot be reduced indefinitely, then the DC output voltage increases, resulting in poor output regulation. This unfavorable situation becomes worse if the load is completely removed. To improve the output regulation, a constant load may be connected internal to the power supply. However, because the internal load is always connected, even when there is no load at the DC output, the power supply efficiency is decreased. The power supply efficiency loss is generally due to three components: (1) DC operating power that keeps the switching regulator circuitry operating, (2) the switching losses that are due to switching of the switching regulator output transistor and its drivers—switching losses are directly proportional to the operating frequency, and (3) the power that is consumed by the internal load.

In order to improve efficiency, a switching regulator may use a method called cycle skipping. Cycle skipping method involves reducing the duty cycle as the load decreases, and when the duty cycle is reduced down to a predetermined minimum duty cycle, it alternatively switches for some duration of time and stays idle for another duration of time depending on the load. During this mode, if the load increases very slightly, the output transistor will switch at minimum duty cycle for a short time until the power demanded by the load is delivered and then stop switching again. In theory, the cycle skipping mode decreases the switching losses at light loads since switching occurs as intermittent groups of pulses. Also, cycle skipping eliminates the need for the constant internal load. However, if the groups of pulses occur at a frequency that is within the audio range and the minimum duty cycle is larger than optimum, then the power supply may create an undesirable audio noise. In addition, cycle skipping degrades the output ripple since it typically occurs in groups of pulses and therefore the energy is delivered to the load intermittently.

SUMMARY OF THE INVENTION

Switching regulator methods and apparatuses are disclosed. In one embodiment, a switching regulator includes a power switch coupled between first and second terminals. The first terminal is to be coupled to an energy transfer element of a power supply and the second terminal is to be coupled to a supply rail of the power supply. A control circuit is coupled to a third terminal and the power switch. The third terminal is to be coupled to an output of the power supply. The control circuit is coupled to generate a feedback signal responsive to the output of the power supply. The control circuit is coupled to switch the power switch in response to the feedback signal. The control circuit is coupled to switch the power switch at a fixed switching frequency for a first range of feedback signal values and coupled to vary a switching frequency of the power switch without skipping cycles in response to the feedback signal for a second range of feedback signal values. Additional features and benefits of the present invention will become apparent from the detailed description, figures and claims set forth below.

BRIEF DESCRIPTION OF THE DRAWINGS

The present invention detailed illustrated by way of example and not limitation in the accompanying figures.

FIG. 3 is a timing diagram illustrating waveforms of one embodiment of switching regulator operating at full frequency in accordance with the teachings of the present invention.

FIG. 4 is a timing diagram illustrating waveforms of one embodiment of switching regulator operating at a lower frequency in accordance with the teachings of the present invention.

DETAILED DESCRIPTION

Method and an apparatus for regulating a power supply are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

The present invention improves the efficiency of a power supply switching regulator with pulse width modulation by decreasing the operating frequency at light loads. Switching losses are decreased with one embodiment of the present invention since switching losses are directly proportional to operating frequency. Audio noise problems associated with present day switching regulators are no longer a problem because the minimum operating frequency of a switching regulator in accordance with the teachings of the present invention is chosen to be above audible frequency. One embodiment of the present invention also improves output ripple since the pulse width modulation is continuous in nature and not intermittent.

Figure 1:
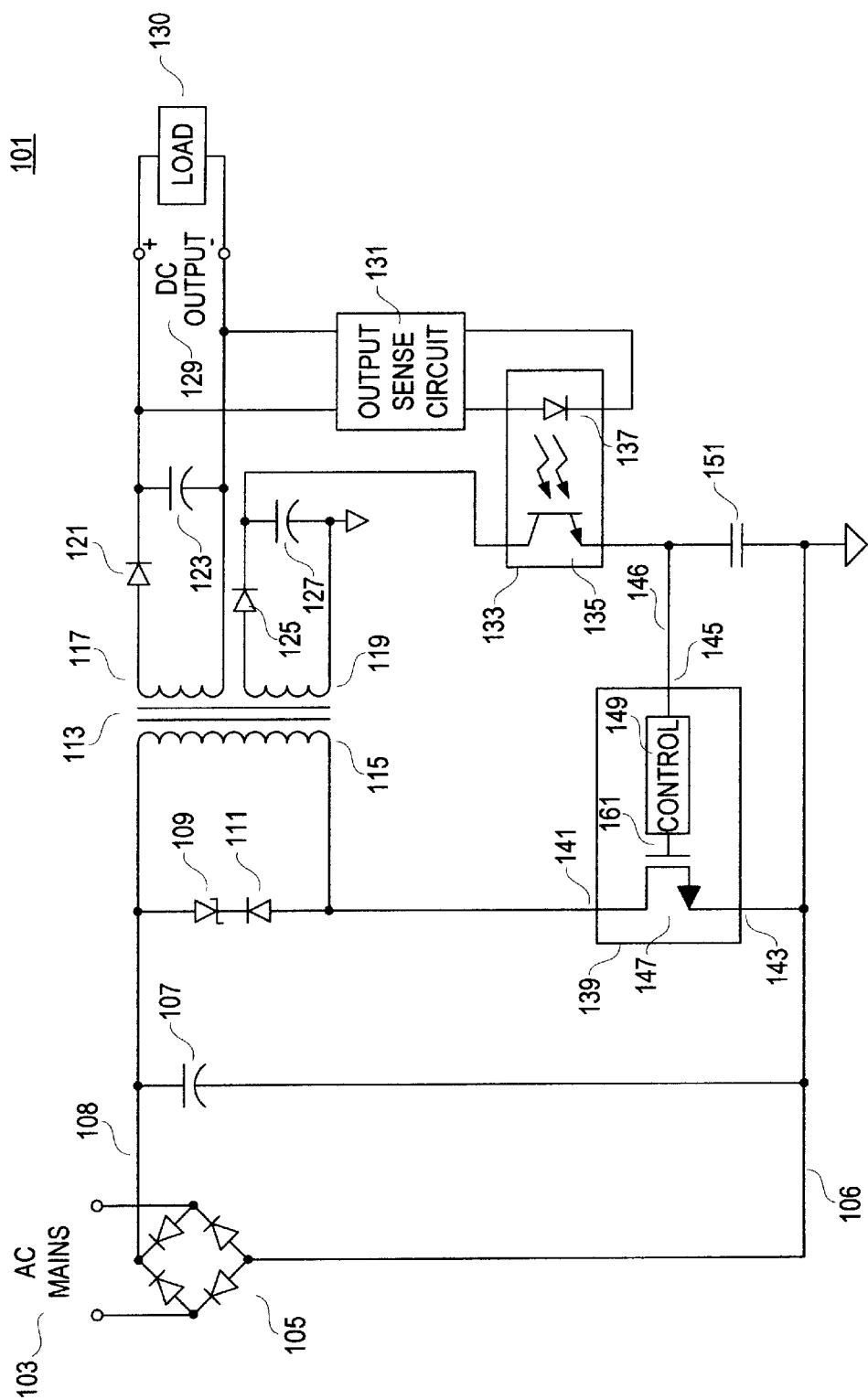
FIG. 1 is a schematic illustrating one embodiment of a power supply including a switching regulator in accordance with the teachings of the present invention.

To illustrate, FIG. 1 is a block diagram showing a power supply 101 including one embodiment of a switching regulator 139 in accordance with the teachings of the present invention. As shown, a bridge rectifier 105 and capacitor 107 are coupled to rectify and filter an input alternating current (AC) voltage received at AC mains 103. In one embodiment, a positive power supply rail 108 and a ground power supply rail 106 are provided across capacitor 107. The rectified voltage generated by bridge rectifier 105 and capacitor 107 is received at a primary winding 115 of an energy transfer element, such as transformer 113. In one embodiment, transformer 113 includes a secondary winding 117 and a bias winding 119. Diode 121 and capacitor 123 rectify and filter DC output 129, whereas diode 125 and capacitor 127 rectify and filter the bias winding.

The switching regulator 139 includes a drain terminal 141 coupled to the primary winding 115 and a source terminal 143 coupled to the ground rail 106. In one embodiment, switching regulator 139 includes a control circuit 149, which generates a drive signal 161 to switch a power switch 147 to transfer the energy to the secondary winding 117 using transformer 113. Diode 111 and Zener 109 are used for clamping the drain terminal 141.

A load 130 is configured to be coupled across output 129. A feedback loop is formed from output 129 through output sense circuit 131 to a control terminal 145 of the switching regulator 139. The feedback loop includes the output sense circuit 131 and opto-coupler 133. The opto-coupler 133 includes a transistor 135 that is optically coupled to a photodiode 137. An output sense signal 146 responsive to output sense circuit 131 is coupled to be received by control terminal 145 of the switching regulator 139. Output sense signal 146 may be a current or a voltage. The combined bias supply current as well as the feedback current is provided to the control terminal 145 by the opto-coupler 133 using the bias winding 119. Thus, the control terminal 145 may be characterized as a supply voltage ($V_s$)/feedback terminal for switching regulator 139. This control terminal 145 is therefore frequently referred to as a combined electrical terminal. An external capacitor 151 is connected between control terminal 145 and ground.

Figure 2:
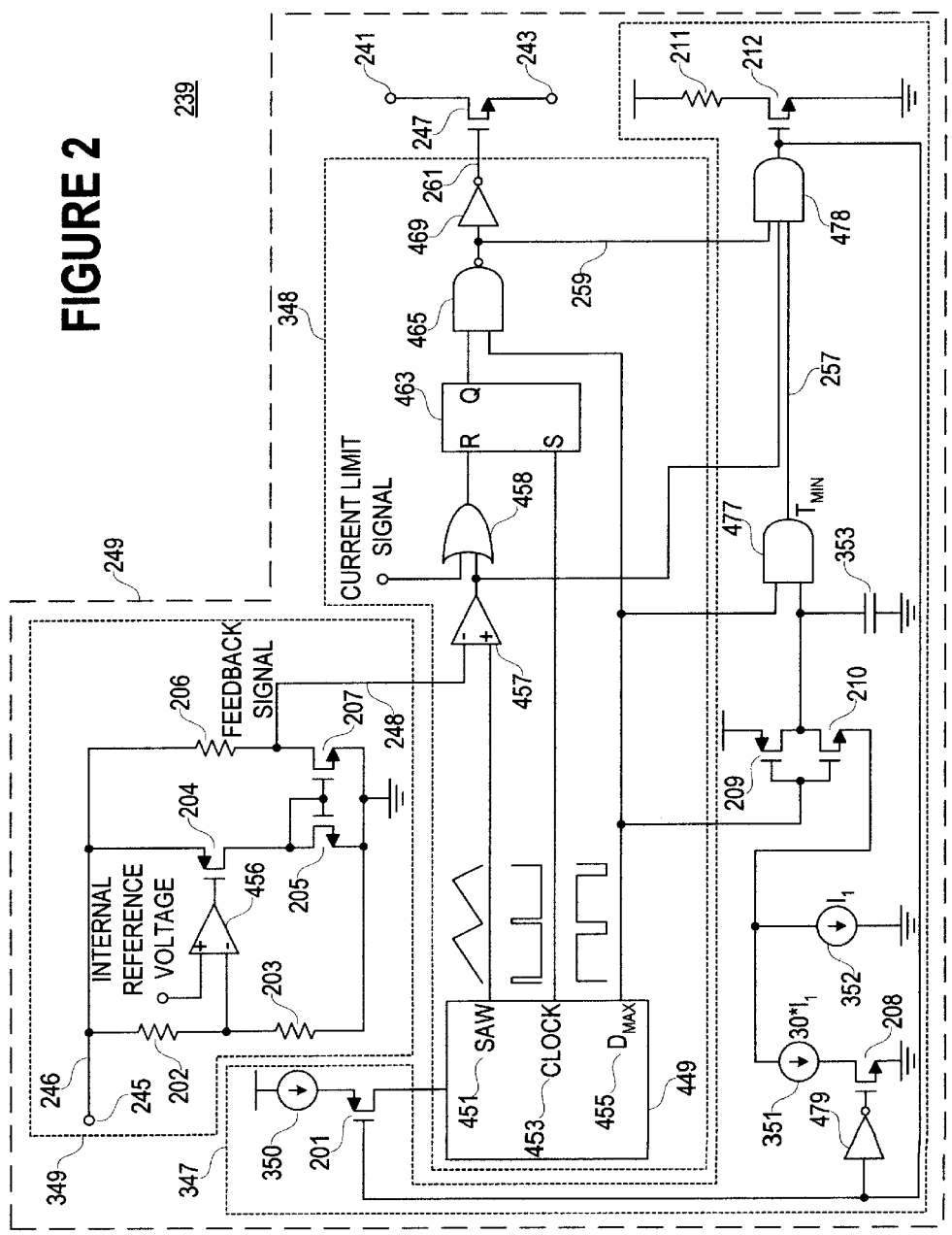
FIG. 2 is a schematic illustrating one embodiment of a switching regulator in accordance with the teachings of the present invention.

FIG. 2 is a schematic illustrating one embodiment of a switching regulator 239 in accordance with the teachings of the present invention. In one embodiment, switching regulator 239 of FIG. 2 may be utilized in place of switching regulator 139 of FIG. 1. As shown, an example embodiment of switching regulator 239 includes a power switch 247 coupled between a drain terminal 241 and a source terminal 243. A gate of power switch 247 is coupled to be switched in response to a drive signal 261 generated by control circuit 249.

Control circuit 249 includes a feedback signal circuit 349 coupled to generate a feedback signal 248 responsive to an output sense signal 246 coupled to be received by control terminal 245. In one embodiment, an internal bias current for switching regulator 239 during normal operation is provided by an internal shunt regulator coupled to control terminal 245. In one embodiment, an external capacitor, such as capacitor 151 of FIG. 1, is coupled to control terminal 245. For instance, one embodiment of switching regulator 239 is powered after an initial turn-on by current into control terminal 245 through opto-coupler 133 from output sense circuit 131, which is coupled to the output 129 of power supply 101, as shown in FIG. 1. Part of the current that goes into control terminal 245 powers up the circuitry of switching regulator 239 and the remainder is shunted to ground by the shunt regulator. Feedback signal 248 is extracted from the amount of current that is shunted to ground. If there is a substantial load 130 coupled to the output 129 of power supply 101, then all available current goes to the load.

To illustrate, attention is directed to feedback signal circuit 349 of FIG. 2. As shown, comparator 456 includes a positive terminal coupled to an internal reference voltage. The negative terminal of comparator 456 is connected to a voltage that is a fraction of the control terminal 245 voltage through a voltage divider network of resistors including resistors 202 and 203. Comparator 456 compares the internal reference voltage to the fraction of control terminal 245 voltage. If the internal reference voltage is lower than the fraction of control terminal 245 voltage, indicating that the control terminal 245 voltage is at the nominal voltage, the output of comparator 456 goes low, turning on transistor 204. Any excess current that is going into the control terminal 245 is shunted to ground through transistors 204 and 205. Since the transistors 205 and 207 form a current mirror, a proportional fraction of this shunt current is used as the feedback current in transistor 207. The feedback current is converted to a feedback voltage signal through resistor 206, from which feedback signal 248 is generated.

An example embodiment of control circuit 249 includes a pulse width modulator (PWM) circuit 348. PWM circuit 348 generates drive signal 261 in response to feedback signal 248, which is used to control the duty cycle of power switch 247. PWM circuit 348 includes an oscillator 449 that generates three signals: SAW 451, CLOCK 453 and DMAX 455. As illustrated, the DMAX 455 signal is high during the ramp-up of SAW 451 and DMAX 455 is low during the ramp-down of SAW 451. In one embodiment, the CLOCK 453 signal is a short pulse generated at the low to high transition of DMAX 455. The CLOCK 453 signal is coupled to the S input of flip-flop 463 to set flip-flop 463.

When the CLOCK 453 signal goes high, the Q signal output of the flip-flop 463 goes high and remains high until the flip-flop 463 is reset by the R input of flip-flop 463 going high at a later time. The Q signal output of flip-flop 463 is coupled to one of the inputs of the NAND gate 465. The other input of the NAND gate 465 comes from the DMAX 455 signal of the oscillator 449. Since DMAX 455 is also high during this time, the output of NAND gate 465 is low and the output of the inverter 469 is high. In one embodiment, the output of inverter 469 is drive signal 261 coupled to switch power switch 247.

When drive signal 261 is high, the power switch 247 is on. In one embodiment, drive signal 261 is coupled to turn off power switch 247 when either of the following conditions are met: the reset R input of the flip-flop 463 goes high, or, DMAX 455 of oscillator 449 goes low, which corresponds to maximum duty cycle condition during start-up or an overload condition. The reset R input of the flip-flop 463 goes high if the output of the comparator 457 goes high, or, if the current limit signal input of OR gate 458 goes high.

As shown, one input of OR gate 458 is coupled to receive the current limit signal and the other input of OR gate 458 is coupled to receive an output of comparator 457. In one embodiment, the current limit signal going high indicates that the current through the power switch 247 has exceeded a prescribed limit and the power switch 247 is immediately turned off. The output of comparator 457 goes high when the SAW 451 signal of oscillator 449 is higher than the feedback signal 248 coming from the drain of transistor 207. In one embodiment, the feedback signal 248 is a very slow moving signal—almost a DC level signal in comparison to the SAW 451 signal of oscillator 449. In one embodiment, the SAW 451 signal is a 100 kHz saw-tooth signal.

In one embodiment, PWM circuit 348 operates under at least three different conditions: (1) when the feedback signal 248 is less than the "valleys" of the SAW 451 signal, (2) when the feedback signal 248 is greater than the "peaks" of the SAW 451 signal, and (3) when the feedback signal 248 is in between the "peaks" and "valleys" of the SAW 451 signal.

When there is a considerable current through the resistor 206, there is a corresponding voltage drop across resistor 206 and feedback signal 248 is below the "valleys" of the SAW 451 signal. In one embodiment, a large amount of current through the resistor 206 indicates that there is large amount of current being dumped into the control terminal 246, which in turn indicates that the power demand by load 130, which is coupled to the output 129 of power supply 101, is low. In this situation, the positive terminal of the comparator 457 is always greater than the negative terminal and the output of the comparator 457 is always high, which keeps the R input of flip-flop 463 high through OR gate 458. When CLOCK 453 signal sets the flip-flop 463 through the S input, the Q output of flip-flop 463 is ready to go high and pull the gate of power switch 473 high to turn on power switch 473. However, since R input of the flip-flop 463 is kept high, the flip-flop 463 is reset immediately and the Q output of flip-flop 463 goes back down immediately, never allowing the power switch 247 to turn on.

In one embodiment, the feedback signal 248 is greater than the "peaks" of the SAW 451 signal when there is not enough current through the resistor 206 to drop the voltage of feedback signal 248 down. In one embodiment, this is the case when the output 129 is heavily loaded by load 130. In this situation, the positive terminal of the comparator 457 is always less than the negative terminal and the output of the comparator 457 is always low, keeping the R input of flip-flop 463 low and never resetting the flip-flop 463. This means that after the CLOCK 453 signal turns on the power switch 473 by setting the flip-flop 463, which makes the Q output of flip-flop 463 go high, the power switch 247 is not turned off until the DMAX 455 signal goes from high to low, or until the power switch 247 reaches current limit, allowing the output transistor to remain on for the maximum duty cycle or until power switch 247 reaches its current limit.

In one embodiment, when the feedback signal is less than the "peaks," but greater than the "valleys" of the SAW 451 signal, the power supply 101 is operating within its nominal load range. In this case, PWM 348 will set the proper duty cycle for drive signal 261 in response to feedback signal 248 to keep the output 129 of power supply 101 regulated.

In one embodiment, control circuit 249 also includes a timer circuit 347 in accordance with the teachings of the present invention. In one embodiment, if the duty cycle of drive signal 261 is larger than 10%, the switching regulator 239 operates at a full frequency. In one embodiment, the full frequency is 100 kHz. It is appreciated of course that actual values provided in this disclosure, such as the 100 kHz frequency value, are provided for explanation purposes and that other actual values may be utilized in accordance with the teachings of the present invention. For purposes of this disclosure, the duty cycle of drive signal 261 is equal to the on-time of drive signal 261 divided by the period T of drive signal 261. The period T is equal to the on-time+off-time of drive signal 261. Thus, for a drive signal 261 with a full frequency of 100 kHz, the period T of each cycle of drive signal 261 is equal to $\frac{1}{100}$ kHz or 10 μs and the on-time of a 10% duty cycle signal is equal to 1 μs. Thus, the off-time of a 10% duty cycle signal is equal to 10 μs–1 μs, or 9 μs. It is appreciated that PWM circuit 348 adjusts the duty cycle of drive signal 261 in response feedback signal 248, which is responsive to the level of the load 130 coupled to output 129 as well as the input voltage of power supply 101.

In one embodiment, there are two modes of operation for a switching regulator 239 in accordance with the teachings of the present invention—full frequency and low frequency. In one embodiment, the on-time of the power switch 247, which is responsive to feedback signal 248, determines whether switching regulator 239 operates at full frequency or low frequency. In one embodiment, when the on-time of drive signal 261 is greater than 1 μs, the PWM circuit 348 operates in full frequency mode. When the on-time of drive signal 261 is less than 1 μs, the PWM circuit 348 operates in low frequency mode. Therefore, since the duty cycle of drive signal 261 is responsive to feedback signal 248, the PWM circuit 348 operates in full frequency mode for one range of values for feedback signal 248 and PWM circuit 348 operates in low frequency mode for another range of values for feedback signal 248.

In one embodiment, switching regulator 239 is operated in full and low frequency modes as follows. A signal designated TMIN 257 is derived from the DMAX 455 signal. In one embodiment, TMIN 257 includes a pulse that is generated at each rising edge of DMAX 455. As illustrated, the duration of the pulse of TMIN 257 is determined by a capacitor 353 and current sources 351 and 352. In one embodiment, capacitor 353 is coupled to be discharged through current sources 351 and 352 through transistor 210. In one embodiment, current source 351 draws charge at a rate 30 times greater than current source 352 from capacitor 353. When both current sources 351 and 352 are on at the same time to discharge capacitor 353, the duration of the TMIN 257 pulse width will be 1 μs, 10% of the full frequency period of one embodiment of drive signal 261. In one embodiment, the current source 352 is always activated to discharge capacitor 353. However, the current source 351 is only activated to discharge capacitor 353 when the output of inverter 479 is high, or output of AND gate 478 is low. In one embodiment, AND gate 478 output will always be low if the gate of power switch 247 is on for longer than 1 μs since AND gate 478 combines an inverted drive signal 261 (from the output of NAND gate 465) with TMIN 257. In one embodiment, when the drive signal 261 is on for longer than 1 μs, the AND gate 478 output remains low and transistor 201 remains on to keep oscillator 449 unaffected. In one embodiment, the frequency of drive signal 261 remains constant at 100 kHz in this case.

In one embodiment, as the duty cycle of drive signal 261 falls below 10% in response to feedback signal 248, the switching regulator 239 goes into low frequency operation. In one embodiment, as the duty cycle of drive signal 261 drops below 10%, or the on-time of drive signal 261 falls below 1 µs, the output of the NAND gate 465 goes high while TMIN 257 is still high. During this time, if the status of drive signal 261 was determined through the feedback signal 248, instead of the current limit signal received at the input of OR gate 458, the output of the comparator 456 is also high. With all of the inputs of AND gate 478 being high, the output of AND gate 478 goes high and turns off transistor 201, cutting off the current into the oscillator 449 and suspending oscillations generated by oscillator 449.

In one embodiment, oscillator 449 maintains the value of SAW 451 at its last voltage magnitude, and the signals CLOCK 453 and DMAX 455 stop switching in response to oscillator 449 being suspended in response to transistor 201 being turned off. In one embodiment, when the output of AND gate 478 goes high, the output of inverter 479 goes low and transistor 208 turns off, which deactivates the current source 351 from discharging capacitor 353. Since the current that discharges the capacitor 353 is 31 times smaller now that current source 351 deactivated, capacitor 353 discharges at a slower rate and remains charged for a longer amount of time. Consequently, the remaining on-time of TMIN 257 is increased by 31 times. As a result, the pulse width of TMIN 257 is increased from a fixed 1 µs value to the value determined by the following equation:

For DSPW>1 µs: TMINPW=1 µs;

for DSPW<1 µs: TMINPW=((1 µs−DSPW)*31)+DSPW  (Eq. 1)

where TMINPW is TMIN 257 pulse width and DSPW is drive signal 261 pulse width.

The oscillator 449 is suspended from switching for the duration of TMIN 257 pulse width minus the drive signal 261 pulse width and then released. When released, the operation of oscillator 449 resumes from where it left off and SAW 451 signal ramps up from the point at where it had been suspended. Accordingly, the switching period of drive signal 261 is increased from 10 µs of full frequency operation to a value determined by the following equation:

For DSPW<1 µs: LFPDS=(TMINPW−DSPW)+10 µs  (Eq. 2)

where LFPDS is low frequency period of drive signal 261 and TMINPW is TMIN 257 pulse width.

To illustrate, FIGS. 3 and 4 show full frequency and low frequency operation, respectively, of a switching regulator in accordance with the teachings of the present invention. In particular, FIG. 3 shows full frequency operation, which in one embodiment occurs when feedback signal 248 is in a range that causes the duty cycle of drive signal 261 to be greater than 10%. As shown in FIG. 3, feedback signal 248 is in between the "peaks" and "valleys" of SAW 251 signal. SAW 251 signal rises in from "valley" to "peak" in 6 µs and falls from "peak" to "valley" in 4 µs, which results in a full operating frequency of 100 kHz. In the example shown, drive signal has an on-time of 2 µs or a duty cycle of 20%, which is greater than 10%. Accordingly, switching regulator 239 operates in full frequency mode. The inverted drive signal 259 keeps both current sources 351 and 352 activated all the time, allowing capacitor 353 to be discharged at the faster rate for an entire 1 µs. Thus, TMIN 257 has a pulse width or on-time of 1 µs.

In comparison, FIG. 4 shows low frequency operation, which in one embodiment occurs when feedback signal 248 is in a range that causes the duty cycle of drive signal 261 to be less than 10%. In the particular example illustrated in FIG. 4, the on-time of drive signal 261 is only 0.5 µs, which is less than 1 µs. As shown, since the on-time of drive signal 261 is only 0.5 µs, which is less than 1 µs, capacitor 353 is still not fully discharged when current source 351 is deactivated and oscillator 449 is suspended. As shown, SAW 251 signal is caused to be held at the voltage when oscillator 449 was suspended and TMIN 257 now remains high for more than 1 µs since capacitor 353 is discharged at a slower rate as a result of current source 351 being deactivated. Indeed, as shown, TMIN 257 remains high for the next 0.5 µs * 31=15.5 µs. After TMIN 257 goes low, the operation of oscillator 449 is resumed and SAW 251 signal continues to oscillate from where it left off to rise to its "peak" in 5.5 µs and subsequently fell to its "valley" in the normal 4 µs.

In the illustrated example of FIG. 4, the switching frequency of drive signal 261 is reduced down to 39.2 kHz and the period of the drive signal has been increased to 25.5 µs (0.5 µs+15.5 µs+5.5 µs+4 µs). If the voltage of feedback signal 248 goes down more, the switching frequency of drive signal 261 decreases further in accordance with the teachings of the present invention. Note that the frequency of drive signal 261 is reduced without skipping cycles of drive signal 261 in accordance with the teachings of the present invention. Instead, the period of each cycle is increased to reduce the frequency of drive signal 261. In one embodiment, both the on-time and the off-time of each cycle of the drive signal 261 are adjusted simultaneously when increasing the period of the drive signal 261 in accordance with the teachings of the present invention.

In one embodiment, the lowest frequency that the power supply controller can go to can be calculated using the formulas above. In particular, assuming that the as the feedback signal 248 voltage decreases down to the voltage of the "valleys" of the SAW 251 signal, the on-time of drive signal 261 reduces to a substantially zero or negligible amount. In this case, using Equations 1 and 2 above:

TMINPW=((1 µs−~0 µs)*31)+~0 µs=31 µs,  (Eq. 3)

LFPDS=(TMINPW−0 µs)+10 µs=41 µs  (Eq. 4)

where TMINPW is TMIN 257 pulse width and LFPDS is low frequency period of drive signal 261. Thus, the period of drive signal 261 at the lowest frequency in this particular embodiment is 41 µs.

The low frequency period of 41 µs corresponds to a frequency of 1/41 µs, or 24.4 kHz. Since the lowest switching frequency of 24.4 kHz is higher than the human audible frequency range of 20 to 20 kHz, a power supply 101 regulated with a switching regulator in accordance with the teachings of the present invention will not produce any audible noise, even at its lowest frequency.

Referring back to the embodiment shown in FIG. 2, timer circuit 347 also includes a transistor 212 switched in response to the output of AND gate 478. Transistor 212 acts as a switch to allow current to flow through resistor 211. The purpose of resistor 211 and transistor 212 is to keep the current consumption of switching regulator 239 during low frequency operation the same as the current consumption was during full frequency operation. As discussed earlier, one embodiment of switching regulator 239 is powered by a current into the control terminal 245 through opto-coupler 133 from output sense circuit coupled 131 to the output 129 of the power supply 101. In one embodiment, part of the current that goes into the control terminal 245 powers up the circuitry of switching regulator 239 and the remainder of the current is shunted to ground by the shunt regulator. The feedback signal 248 is extracted from the amount of the current that is shunted to ground.

As the frequency of drive signal 261 decreases during the low frequency operation, the power consumed due to switching of the internal circuitry of switching regulator 239 decreases, resulting in less current going into the circuitry of switching regulator 239 and more current being shunted to ground. As the current being shunted to ground increases, the portion of this current that is being used for extracting the feedback signal 248 would also increase, causing the feedback signal 248 to go lower. Correspondingly, the switching frequency of drive signal 261 would then go lower due to decreased current consumption of the switching regulator 239.

Thus, to keep the current consumption of the switching regulator substantially constant, additional current is drawn in low frequency mode operation through resistor 211 and transistor 212 to compensate for the difference in switching losses between full and low frequency operating modes of switching regulator 239 in accordance with the teachings of the present invention. If the additional current is greater than the reduction of power consumption, then, the pulse width modulation gain, i.e. the duty cycle versus control terminal 245 current, will be slightly reduced.

Figure 5:
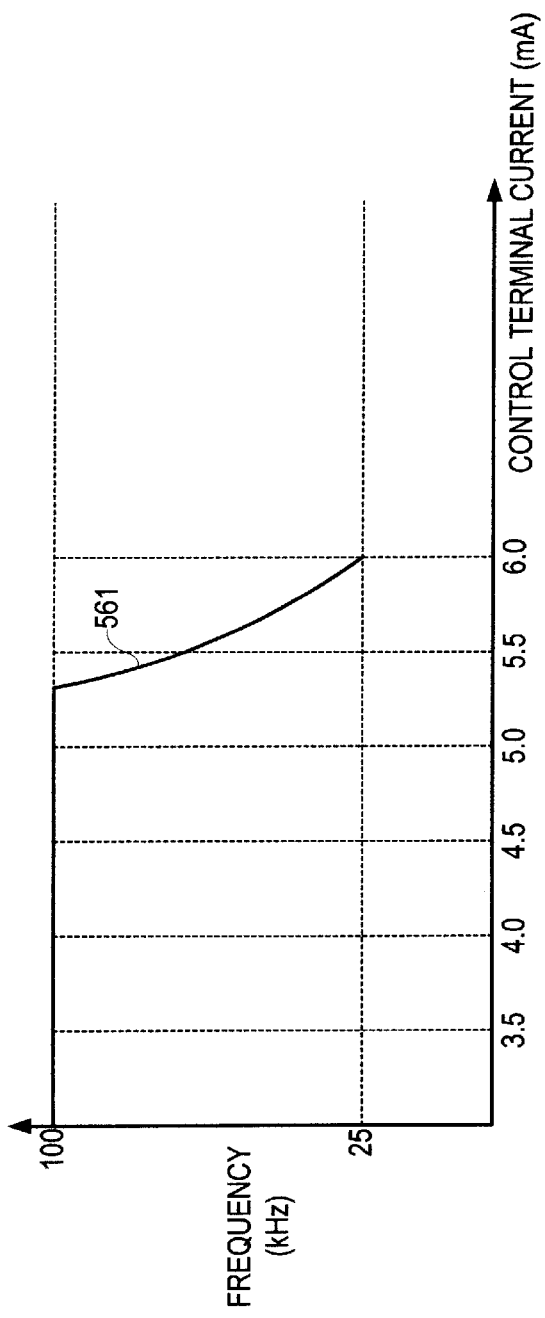
FIG. 5 is a diagram illustrating one embodiment of a relationship between frequency and current in one embodiment of switching regulator in accordance with the teachings of the present invention.
Figure 6:
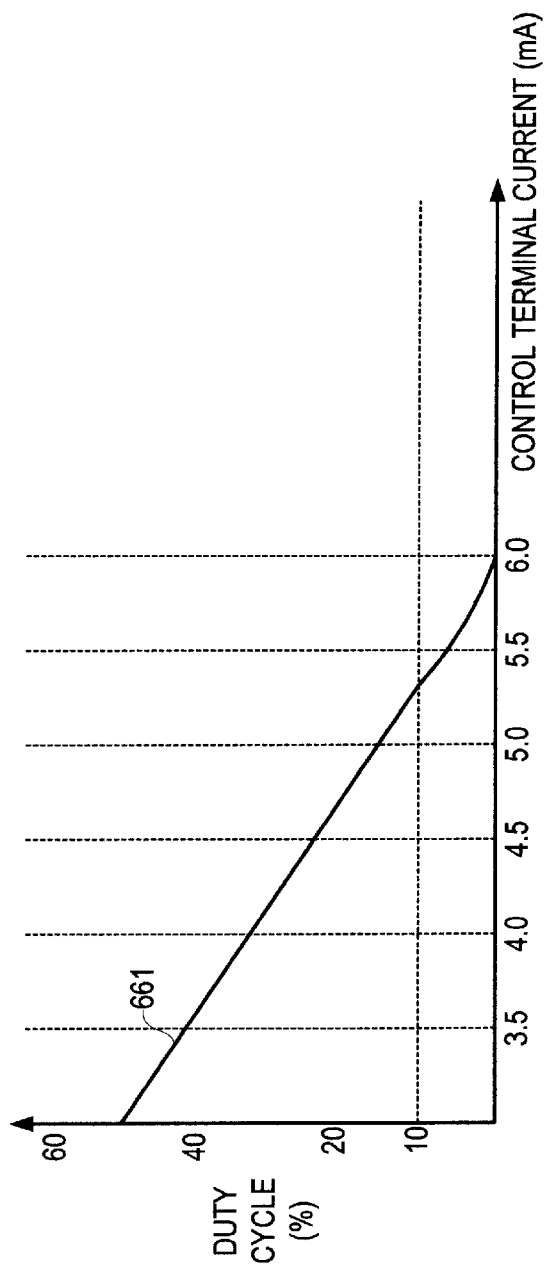
FIG. 6 is a diagram illustrating one embodiment of a relationship between duty cycle and current in one embodiment of switching regulator in accordance with the teachings of the present invention.

FIGS. 5 and 6 are diagrams illustrating the relationships of frequency vs. current 561, and duty cycle vs. current 661, respectively, in one embodiment of switching regulator in accordance with the teachings of the present invention. In particular, FIG. 6 shows that as the current into the control terminal 245 increases, the duty cycle of drive signal 261 decreases. In one embodiment, the duty cycle of drive signal 261 decreases in a linear type fashion relative to the current into control terminal 245 across the full and low frequency modes of the switching regulator in accordance with the teachings of the present invention.

FIG. 5 shows that in one embodiment as the duty cycle of drive signal 261 decreases, the switching frequency of drive signal 261 remains fixed until the duty cycle is reduced to a value such as 10%. As the duty cycle of drive signal 261 falls below 10%, in one embodiment, the frequency of drive signal 261 starts to decrease gradually, all the way down to approximately 25 kHz, by which time the duty cycle of drive signal 261 goes down to 0%. In one embodiment, the frequency of drive signal 261 decreases in a nearly linear type fashion in response to control terminal 245 current across the full and low frequency modes of the switching regulator in accordance with the teachings of the present invention.

In one embodiment, feedback signal 248 is responsive to the control terminal 245 current. Therefore, for one range of feedback signal 248 values, the switching regulator 239 operates at a fixed frequency and for another range of feedback signal 248 values, the frequency of operation of the switching regulator 239 is decreased in response to the feedback signal 248. In one embodiment, the boundary of fixed frequency operation and low frequency operation is a feedback signal 248 value that corresponds to a 10% duty cycle.

In one embodiment of the present invention, switching regulator 239 is operated at a full frequency operation at 130 kHz. In this embodiment, the on-time of drive signal 261 that corresponds to the boundary at which switching regulator 239 is operated in either full frequency or low frequency can be adjusted by adjusting the TMIN 257 time constant when both current sources 351 and 352 are on. In one embodiment, the minimum frequency of drive signal 261 is 40 kHz. In another embodiment, switching regulator 239 is operated at a full frequency operation at 65 kHz with a minimum frequency for drive signal of 20 kHz.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A switching regulator, comprising:
   a power switch coupled between first and second terminals, the first terminal to be coupled to an energy transfer element of a power supply and the second terminal to be coupled to a supply rail of the power supply;
   a control circuit coupled to a third terminal and the power switch, the third terminal to be coupled to an output of the power supply, the control circuit coupled to generate a feedback signal responsive to the output of the power supply, the control circuit coupled to switch the power switch in response to the feedback signal, the control circuit coupled to switch the power switch at a fixed switching frequency for a first range of feedback signal values, the control circuit coupled to vary a switching frequency of the power switch without skipping cycles in response to the feedback signal for a second range of feedback signal values.

2. The switching regulator of claim 1 wherein the control circuit comprises:
   a feedback signal circuit coupled to the third terminal, the feedback signal circuit coupled to generate the feedback signal; and
   a pulse width modulator circuit coupled to switch the power switch in response to the feedback signal.

3. The switching regulator of claim 1 wherein the first and second ranges of the feedback signal correspond to first and second ranges of levels of a load coupled to the output of the power supply.

4. The switching regulator of claim 2 wherein the first and second ranges of the feedback signal correspond to first and second ranges of on-time values of a drive signal generated by the pulse width modulator circuit to switch the power switch.

5. The switching regulator of claim 2 wherein the first and second ranges of the feedback signal correspond to first and second ranges of duty cycle percentage values of a drive signal generated by the pulse width modulator circuit to switch the power switch.

6. The switching regulator of claim 2 wherein an off-time value of a drive signal generated by the pulse width modulator circuit to switch the power switch varies as a function of a level of a load coupled to the output of the power supply to vary the switching frequency of the power switch without skipping cycles for the second range of feedback signal values.

7. The switching regulator of claim 2 wherein on-time and off-time values of a drive signal generated by the pulse width modulator circuit to switch the power switch vary simultaneously as a function of a level of a load coupled to the output of the power supply to vary the switching frequency of the power switch without skipping cycles for the second range of feedback signal values.

8. The switching regulator of claim 7 wherein the off-time value of the drive signal is varied as a function of the on-time value and a first on-time value of the drive signal, the first on-time value of the drive signal corresponding to an on-time of the drive signal at a boundary between the first and second ranges of feedback signal values.

9. The switching regulator of claim 2 wherein the switching frequency of the power switch is reduced without skipping cycles for the second range of feedback signal values as a level of load coupled to the output of the power supply is reduced.

10. The switching regulator of claim 9 wherein the switching frequency of the power switch is reduced without skipping cycles to a minimum frequency when a duty cycle percentage value of a drive signal generated by the pulse width modulator circuit to switch the power switch is substantially equal to zero percent.

11. A power supply, comprising:
an energy transfer element having an energy transfer element input and an energy transfer element output coupled to an output of the power supply;
a switching regulator circuit including a power switch coupled to the energy transfer element input, and a control circuit coupled to the power switch and the output of the power supply, the control circuit coupled to generate a feedback signal responsive to the output of the power supply, the control circuit coupled to switch the power switch in response to the feedback signal, the control circuit coupled to switch the power switch at a fixed switching frequency for a first range of feedback signal values, the control circuit coupled to vary a switching frequency of the power switch without skipping cycles in response to the feedback signal for a second range of feedback signal values.

12. The power supply of claim 11 wherein the control circuit comprises:
a feedback signal circuit coupled to the output of the power supply, the feedback signal circuit coupled to generate the feedback signal; and
a pulse width modulator circuit coupled to switch the power switch in response to the feedback signal.

13. The power supply of claim 12 further comprising an output sense circuit coupled between the output of the power supply and the switching regulator circuit, the output sense circuit coupled to provide an output sense signal to the switching regulator that is proportional to an output voltage or current supplied by the output of the power supply, wherein a duty cycle variation provided by a drive signal generated by the pulse width modulator circuit to switch the power switch is inversely proportional to the output sense signal.

14. The power supply of claim 11 wherein the first and second ranges of the feedback signal correspond to first and second ranges of levels of a load coupled to the output of the power supply.

15. The power supply of claim 12 wherein the first and second ranges of the feedback signal correspond to first and second ranges of on-time values of a drive signal generated by the pulse width modulator circuit to switch the power switch.

16. The power supply of claim 12 wherein the first and second ranges of the feedback signal correspond to first and second ranges of duty cycle percentage values of a drive signal generated by the pulse width modulator circuit to switch the power switch.

17. A method for regulating a power supply, comprising:
switching with a drive signal a power switch coupled to an energy transfer element of the power supply to control power delivered to an output of the power supply;
generating a feedback signal in response to the output of the power supply;
maintaining a frequency of the drive signal at a fixed frequency for a first range feedback signal values; and
varying the frequency of the drive signal without skipping cycles in response to the feedback signal for a second range of feedback signal values.

18. The method for regulating the power supply of claim 17 further comprising varying a duty cycle of the drive signal substantially in response to the feedback signal.

19. The method for regulating the power supply of claim 17 wherein generating the feedback signal in response to the output of the power supply comprises monitoring a current representative of a level of the load coupled to the output of the power supply.

20. The method for regulating the power supply of claim 18 wherein generating the feedback signal in response to the output of the power supply comprises monitoring an on-time of the drive signal.

21. The method for regulating the power supply of claim 20 wherein monitoring the on-time of the drive signal comprises timing the on-time of the drive signal with a timer circuit, the method further comprising suspending operation temporarily of an oscillator circuit if the on-time of the drive signal is less than a first on-time value.

22. The method for regulating the power supply of claim 21 wherein timing the on-time of the drive signal with the timer circuit comprises
discharging a capacitor at a first rate during the on-time of the drive signal; and
discharging the capacitor at a second rate during an off-time of the drive signal, the first rate greater than the second rate.

23. The method for regulating the power supply of claim 22 further comprising maintaining a voltage level of a suspended oscillating signal generated by the oscillator circuit while the operation of the oscillator circuit is temporarily suspended.

24. The method for regulating the power supply of claim 23 further comprising resuming operation of the oscillator circuit after the capacitor has been discharged.

25. A switching regulator, comprising:
a power switch coupled between first and second terminals;
a control circuit coupled to a third terminal and coupled to the power switch, the control circuit coupled to receive an output sense signal responsive to an output of a power supply, the control circuit coupled to generate a drive signal to switch the power switch in response to the output sense signal to control the output of the power supply; and
a timer circuit included in the control circuit, the timer circuit coupled to time an on-time of the drive signal, the timer coupled to the control circuit to vary a switching frequency of the drive signal without skipping cycles if the on-time of the drive signal is less than a first on-time value, the drive signal to have a fixed switching frequency if the on-time of the drive signal is greater than the first on time value.

26. The switching regulator of claim 25 wherein the timer circuit comprises a capacitor that is coupled to be charged and discharged in response to the drive signal, the capacitor to be discharged at a first rate during the on-time of the drive signal, the capacitor coupled to be discharged at a second rate during an off-time of the drive signal, the first rate greater than the second rate.

27. The switching regulator of claim 26 wherein the timer circuit further comprises first and second current sources coupled to discharge the capacitor at the first rate, the second current source coupled to discharge the capacitor at the second rate.

28. The switching regulator of claim 26 wherein the control circuit comprises an oscillator circuit coupled to generate an oscillating signal, the oscillator circuit to suspend generating the oscillating signal if the on-time of the drive signal ends prior to the capacitor being discharged, the oscillator circuit coupled to resume generating the oscillating signal after the capacitor has been discharged.

29. The switching regulator of claim 28 wherein the oscillator circuit is coupled to maintain a voltage level of the oscillating signal while the oscillator circuit is suspended, the oscillator circuit is coupled to resume the oscillating signal from the maintained voltage level.

* * * * *

UNITED STATES PATENT AND TRADEMARK OFFICE
CERTIFICATE OF CORRECTION

PATENT NO. : 6,212,079 B1
DATED : April 3, 2001
INVENTOR(S) : Balakrishnan et al.

Page 1 of 1

It is certified that error appears in the above-identified patent and that said Letters Patent is hereby corrected as shown below:

<u>Title page,</u>
*Primary Examiner*, replace examiner last name "Bethane" and insert -- Berhane --.

Signed and Sealed this

Twenty-second Day of January, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,212,079 C1
APPLICATION NO. : 90/007771
DATED : May 5, 2009
INVENTOR(S) : Balu Balakrishnan and Alex B. Djenguerian It is certified that error appears in the above-identified patent and that said Letters Patent is hereby corrected as shown below:

In the Ex Parte Reexamination Certificate (6800th), page 4, column 1, please change the first sentence to read, "Claims 1, 17 and 21 are determined to be patentable as amended."

Please change the fourth sentence to read, "Claims 4, 5, 7, 8, 10-16, 20 and 22-29 were not reexamined."

In the Ex Parte Reexamination Certificate (6800th), please include the text of Claim 21 as amended and shown here below.

21. (amended) The method for regulating the power supply of claim 20 wherein monitoring the on-time of the drive signal comprises timing the on-time of the drive signal with a timer circuit, the method further comprising suspending operation temporarily of [an]*the* oscillator circuit if the on-time of the drive signal is less than a first on-time value.

Signed and Sealed this

Fifteenth Day of December, 2009

David J. Kappos
*Director of the United States Patent and Trademark Office*

(12) EX PARTE REEXAMINATION CERTIFICATE (6800th)
United States Patent
Balakrishnan et al.

(10) Number: US 6,212,079 C1
(45) Certificate Issued: May 5, 2009

(54) METHOD AND APPARATUS FOR IMPROVING EFFICIENCY IN A SWITCHING REGULATOR AT LIGHT LOADS

(75) Inventors: Balu Balakrishnan, Saratoga, CA (US); Alex B. Djenguerian, Saratoga, CA (US)

(73) Assignee: Power Integrations, Inc., Sunnyvale, CA (US)

Reexamination Request:
No. 90/007,771, Oct. 21, 2005
No. 90/008,376, Dec. 14, 2006

Reexamination Certificate for:
Patent No.: 6,212,079
Issued: Apr. 3, 2001
Appl. No.: 09/608,161
Filed: Jun. 30, 2000

Certificate of Correction issued Jan. 22, 2002.

(51) Int. Cl.
*H02M 3/335* (2006.01)
*G05F 1/56* (2006.01)

(52) U.S. Cl. ............................. 363/21; 363/97; 323/284
(58) Field of Classification Search .................. None
See application file for complete search history.

(56) References Cited

U.S. PATENT DOCUMENTS

| | | |
|---|---|---|
| 3,562,668 A | 2/1971 | Bartlett et al. |
| 3,733,519 A | 5/1973 | Griffey |
| 3,733,540 A | 5/1973 | Hawkins |
| 3,909,696 A | 9/1975 | Katou et al. |
| 3,959,716 A | 5/1976 | Gilbert, Jr. et al. |
| 4,031,463 A | 6/1977 | Norberg |
| 4,037,271 A | 7/1977 | Keller |
| 4,058,758 A | 11/1977 | Peterson |
| 4,063,307 A | 12/1977 | Stephens |
| 4,079,294 A | 3/1978 | Teuling |
| 4,079,596 A | 3/1978 | Cheng et al. |
| 4,087,850 A | 5/1978 | Koizumi |
| 4,156,273 A | 5/1979 | Sato |
| 4,251,743 A | 2/1981 | Hareyama |
| 4,263,644 A | 4/1981 | Zellmer |
| 4,263,655 A | 4/1981 | Chappell, Jr. |
| 4,288,831 A | 9/1981 | Dolikian |
| 4,302,803 A | 11/1981 | Shelly |
| 4,315,303 A | 2/1982 | Snyder |

(Continued)

FOREIGN PATENT DOCUMENTS

| | | |
|---|---|---|
| EP | 0 583 038 A1 | 2/1994 |
| EP | 01 91 0877 | 2/2006 |
| JP | 10-014217 | 1/1998 |
| JP | 11-155281 | 6/1999 |
| JP | 11215820 | 8/1999 |
| WO | PCT/US01/05133 | 5/2001 |

OTHER PUBLICATIONS

JP 2002-507504, Notice of the Reason for Refusal (with English Translation), Aug. 28, 2007.

(Continued)

*Primary Examiner*—My-Trang Ton

(57) ABSTRACT

A switching regulator that operates at a frequency for a first range of feedback signal values and at a variable frequency without skipping cycles for a second range of feedback signal values. In one embodiment, a switching regulator for a switched mode power supply includes a power switch coupled between drain and source terminals of the switching regulator, which are to be coupled to control the delivery of power to an output of a power supply. A control terminal of the switching regulator is to be coupled to an output of the power supply. The switching regulator includes a control circuit coupled to the control terminal and generates a feedback signal that is responsive to the output of the power supply. The control circuit also generates a drive signal that is coupled to control the switching of the power switch. The control circuit generates the drive signal responsive to the feedback signal. The drive signal has a fixed frequency for a first range of feedback signal values and at a variable frequency without skipping cycles for a second range of feedback signal values.

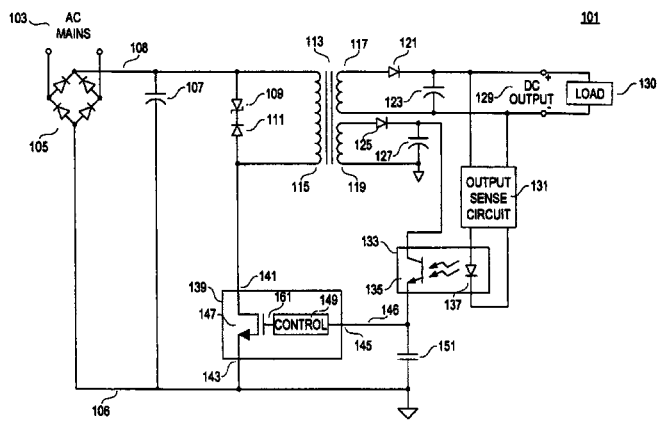

U.S. PATENT DOCUMENTS

| | | |
|---|---|---|
| 4,347,559 A | 8/1982 | Sturgeon |
| 4,400,767 A | 8/1983 | Fenter |
| 4,415,960 A | 11/1983 | Clark, Jr. |
| 4,447,841 A | 5/1984 | Kent |
| 4,450,514 A | 5/1984 | Peruth |
| 4,456,872 A | 6/1984 | Froeschle |
| 4,459,651 A | 7/1984 | Fenter |
| 4,479,174 A | 10/1984 | Cates |
| 4,536,700 A | 8/1985 | Bello et al. |
| 4,541,041 A | 9/1985 | Park et al. |
| 4,578,630 A | 3/1986 | Grosch |
| 4,593,347 A | 6/1986 | Peruth et al. |
| 4,649,464 A | 3/1987 | Shono |
| 4,672,518 A | 6/1987 | Murdock |
| 4,679,131 A | 7/1987 | Filliman |
| 4,685,040 A | 8/1987 | Steigerwald et al. |
| 4,717,994 A | 1/1988 | Diaz et al. |
| 4,733,104 A | 3/1988 | Steigerwald et al. |
| 4,739,465 A | 4/1988 | Asano et al. |
| 4,763,238 A | 8/1988 | Maige |
| 4,764,846 A | 8/1988 | Go |
| 4,772,995 A | 9/1988 | Gautherin et al. |
| 4,809,150 A | 2/1989 | Limuti et al. |
| 4,819,122 A | 4/1989 | Gontowski, Jr. |
| 4,823,070 A | 4/1989 | Nelson |
| 4,849,869 A | 7/1989 | Tanuma et al. |
| 4,928,200 A | 5/1990 | Redl et al. |
| 4,937,728 A | 6/1990 | Leonardi |
| 4,942,508 A | 7/1990 | Nakamura |
| 4,956,761 A | 9/1990 | Higashi |
| 4,959,606 A | 9/1990 | Forge |
| 4,975,823 A | 12/1990 | Rilly et al. |
| 4,980,791 A | 12/1990 | Alberkrack et al. |
| 4,996,638 A | 2/1991 | Orr |
| 5,012,401 A | 4/1991 | Barlage |
| 5,034,871 A | 7/1991 | Okamoto et al. |
| 5,079,453 A | 1/1992 | Tisinger et al. |
| 5,245,526 A | 9/1993 | Balakrishnan et al. |
| 5,282,107 A | 1/1994 | Balakrishnan |
| 5,285,366 A | 2/1994 | Zaretsky |
| 5,285,369 A | 2/1994 | Balakrishnan |
| 5,297,014 A | 3/1994 | Saito et al. |
| 5,313,381 A | 5/1994 | Balakrishnan |
| 5,335,162 A | 8/1994 | Martin-Lopez et al. |
| 5,408,402 A | 4/1995 | Nonnenmacher |
| 5,412,556 A | 5/1995 | Marinus |
| 5,414,342 A | 5/1995 | Mammano et al. |
| 5,414,611 A | 5/1995 | Muto et al. |
| 5,430,633 A | 7/1995 | Smith |
| 5,469,349 A | 11/1995 | Marinus |
| 5,481,178 A | 1/1996 | Wilcox et al. |
| 5,498,995 A | 3/1996 | Szepesi et al. |
| 5,532,626 A | 7/1996 | Khayat |
| 5,568,044 A | 10/1996 | Bittner |
| 5,617,016 A | 4/1997 | Borghi et al. |
| 5,633,788 A | 5/1997 | Tanaka et al. |
| 5,657,215 A | 8/1997 | Faulk |
| 5,675,479 A | 10/1997 | Tani et al. |
| 5,675,485 A | 10/1997 | Seong |
| 5,717,578 A | 2/1998 | Afzal |
| 5,731,694 A | 3/1998 | Wilcox et al. |
| 5,742,494 A | 4/1998 | Brakus et al. |
| 5,745,352 A | 4/1998 | Sandri et al. |
| 5,747,977 A | 5/1998 | Hwang |
| 5,748,461 A | 5/1998 | Preller |
| 5,751,565 A | 5/1998 | Faulk |
| 5,784,232 A | 7/1998 | Farr |
| 5,798,635 A | 8/1998 | Hwang et al. |
| 5,835,361 A | 11/1998 | Fitzgerald |
| 5,859,768 A | 1/1999 | Hall et al. |
| 5,901,051 A | 5/1999 | Takahashi et al. |
| 5,912,552 A | 6/1999 | Tateishi |
| 5,920,466 A | 7/1999 | Hirahara |
| 5,973,945 A | 10/1999 | Balakrishnan et al. |
| 5,995,384 A | 11/1999 | Majid et al. |
| 5,995,387 A | 11/1999 | Takahashi et al. |
| 5,999,421 A | 12/1999 | Liu |
| 6,008,590 A | 12/1999 | Giannopoulos et al. |
| 6,011,706 A | 1/2000 | Adragna et al. |
| 6,094,362 A | 7/2000 | Domingo |
| 6,100,675 A | 8/2000 | Sudo |
| 6,100,678 A | 8/2000 | Hobrecht |
| 6,118,675 A | 9/2000 | Lionetto et al. |
| 6,127,816 A | 10/2000 | Hirst |
| 6,130,528 A | 10/2000 | Aoyama |
| 6,134,123 A | 10/2000 | Yamada |
| 6,147,883 A | 11/2000 | Balakrishnan et al. |
| 6,188,587 B1 | 2/2001 | Yun et al. |
| 6,198,265 B1 | 3/2001 | Stevenson |
| 6,307,356 B1 | 10/2001 | Dwelley |

OTHER PUBLICATIONS

Abraham I Pressman, *Switching Power Supply Design*, McGraw–Hill, Inc. (1998).

Linear Technology's LT1070/LT1071 Data Sheet (1989) ("LT1070 Data Sheet").

Linear Technology's LT1072 Data Sheet (1988) ("LT1072 Data Sheet").

John D. Lenk, Simplified *Design of Switching Power Supplies*, Butterworth–Heinemann (1995).

Balu Balakrishnan, *Three Terminal Off–Line Switching Regulator Reduces Cost and Parts Count*, Official Proceedings of the Twenty–Ninth International Power Conversion Conference, at 267 (1994).

Balu Balakrishnan, *Low–power switchers expand reach*, Electronic Engineering Times, Aug. 29m 1994, at 52.

Design of Isolated Converters Using Simple Switchers, Application Note 1095, National Semiconductor (Aug. 1998) ("LM285X Data Sheet").

CS5124/6 Data Sheet, Cherry Semiconductor (1999) (CS5124 Data Sheet).

Irving M. Gottlieb, *Power Supplies, Switching Regulators, Inverters, and Converters*.

Panov and Jovanovic, *Adaptive Off–Time Control For Variable–Frequency, Soft–Switched Flyback Converter At Light Loads*, 1999 IEEE.

Xunwei Zhou, Mauro Donati, Luca Amoroso, Fred C. Lee, *Improved Light Load Efficiency for Synchronous Rectifier Buck Converter*, 1 Fourteenth Annual Applied Power Electronic Conference and Exposition, IEEE, at 295 (2000).

Wayne M. Austin, *Variable–pulse modulator improves power–supply regulation*, Jun. 25, 1987.

F. J. De Stasi, T. Szepesi, *A 5A 100 KHZ Monolithic Bipolar DC/DC Converter*, The European Power Electronics Association (1993).

Unitrode Current Mode PWM Spec sheet for US1846/7, UC2846/7, UC3836/7.

Motorola, Inc., A 100 kHz FET Switcher, TDT–101 TMOS Power Fet Design Tips sheet.

M. Goodman and O. Kuhlmann, *Current mode control of switching regulators*, IEEE, Oct. 1984.

Micro Linear preliminary spec sheet, ML4803, 8–Pin PFC and PWM Controller Combo, Feb. 1999.

Fairchild Advance Specification for FAN7554/D product, Rev. 0.1, 2000.

Robert Boschert, *Flyback converters: Solid-state solution to low-cost switching power supplies*, Electronics, Dec. 21, 1978.

Ravindra Ambatipudi, Improving Transient Response of Opto-Isolated Converters, PC/M May 1997.

Linear Technology's LT1070/LT1071 Design Manual, Application Note 19, Jun. 1986.

Linear Technology's LT1241 Data Sheet.

Jim Williams, *Regulator IC speeds design of switching power supplies*.

Carl Nelson, *Switching controller chip handles 100W from a 5-pin package*, Electronic Design, Dec. 26, 1985.

Keith Billings, *Switchmode Power Supply Handbook*, McGraw-Hill, Inc. (1989).

Siemens TDA 4714 C, TDA 4716 C, Sep. 1994.

Siemens TDA 4718 A, Dec. 1995.

Texas Instruments TL5001, TL5001A.

R. Mammano, Application Note U-150, Applying the UCC3570 Voltage-Mode PWM Controller to both Off-line and DC/DC Converter Designs.

Unitrode Corporation UCC1570/UCC2570/UCC3570 Data Sheet—Apr. 1999, Revised Jul. 2000.

Unitrode Corporation UCC1809-1/-2/ UCC2809-1/-2/ UCC3809-1/12 Data Sheet—Nov. 1999.

L. Calderoni, L. Pinol, V. Varoli, *Optimal Feed-Forward Compensation for PWM DC/DC Converters*, IEEE, 1990.

L. Calderoni, L. Pinol, V. Varoli, *Optimal Feed-Forward Compensation for PWM DC/DC Converters with "Linear" and "Quadratic" Conversion Ratio*, IEEE, 1992.

Siemens Application Note TDA 4718 and SIPMOS FET.

Siemens IC for Switched-Mode Power Supplies spec.

Siemens Control IC for Single-Ended and Push-Pull Switched-Mode Power Supplies.

Maige, Philippe, "A Universal Power Supply Integrated Circuit for TV and Monitor Applications".

De Stasi, et al. "A 5A 100 Khz monolithic bipolar DC/DC converter".

Linear Technology 5A and 2.5A High Efficiency Switching Regulators.

LM2825 Application Information Guide.

Design of Isolated Converters Using Simple Switchers.

Motorola—Low cost 1.0 A Current Source for Battery Chargers.

Infineon Technologies Application Note: AN-SMPS-1693X-1.

Cherry Semiconductor High Performance, Integrated Current Mode PWM Controllers.

Cherry Semiconductor High Performance, Integrated Current Mode PWM Controllers CS5124/6.

Cherry Semiconductor High Performance, Integrated Current Mode PWM Controllers.

Abstract data sheet for FA3641P.

Fairchild Semiconductor FAN7554/D Versatile PWM Controller.

Boschert, Robert. "Flyback converters: solid-state solution to low-cost switching power supplies," *Electronics*, Dec. 21, 1973.

Ambatipudi, Ravindra, Improving Transient Response of Opto-Isolated Converters.

National Semiconductor LM2825 Integrated Power Supply 1A DC-DC Converter.

Linear Technology LT 1070 Design Manual.

Linear Technology data sheet—5A and 2.5A High Efficiency Switching Regulators.

Williams, Jim, "Regulator IC speeds design of switching power supplies".

Nelson, Carl "Switching controller chip handles 100 W for a 5-pin package".

Mammano, Robert A., Application Note U-150 Applying the UCC3570 Voltage-Mode PWM Controller to Both Off-Line and DC/DC Converter Designs.

Unitrode Corporation UCC1570/UCC2570/UCC3570—Low Power Pulse Width Modulator—data sheet (Apr. 1999, Revised Jul. 2000).

STMicroelectronics, VIPer100/SP, VIPer100A/ASP data sheet (May 1999).

Balakrishnan, Balu, *Next Generation, Monolithic Off-Line Switcher Improves Performance, Flexibility*, PCIM, Apr. 2000.

FA3641P(N), FA3647P(N) Spec Sheet.

Linear Technology's LT1074/LT1076 Data Sheet (1994).

Xunwei Zhou, Mauro Donati, Luca Amoroso, and Fred C. Lee, *Improve Light Load Efficiency for Synchronous Rectifier Buck Converter*, IEEE, 295–302 (1999).

Keith Billings, Switchmode Power Supply Handbook, McGraw-Hill, Inc. (1989) 2.210–2.219.

Zhou et al, "Improve Light Load Efficiency for Synchronous Rectifier Buck Converter," Fourteenth Annual Applied Power Electronics Conference and Exposition, IEEE (Mar. 1999).

US 6,212,079 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 17 are determined to be patentable as amended.

Claims 2–3, 6, 9, 18 and 19, dependent on an amended claim, are determined to be patentable.

New claims 30–52 are added and determined to be patentable.

Claims 4, 5, 7, 8 10–16 and 20–29 were not reexamined.

1. A switching regulator, comprising:
a power switch coupled between first and second terminals, the first terminal to be coupled to an energy transfer element of a power supply and the second terminal to be coupled to a supply rail of the power supply;
a control circuit coupled to a third terminal and the power switch, the third terminal to be coupled to an output of the power supply, the control circuit coupled to generate a feedback signal responsive to the output of the power supply, the control circuit coupled to switch the power switch in response to the feedback signal[.]; *and*
*an oscillator circuit included in the control circuit for controlling both a switching frequency and a maximum duty cycle of the power switch,*
wherein the control circuit *is* coupled to switch the power switch at a fixed switching frequency for a first range of feedback signal values *when the output of the power supply is in regulation, and wherein* the control circuit *is* coupled to vary a switching frequency of the power switch without skipping cycles in response to the feedback signal for a second range of feedback signal values *when the output of the power supply is in regulation*.

17. A method for regulating a power supply, comrpising:
switching with a drive signal a power switch coupled to an energy transfer element of the power supply to control power delivered to an output of the power supply;
generating a feedback signal in response to the output of the power supply;
maintaining a frequency of the drive signal at a fixed frequency for a first range *of* feedback signal values [and] *when the output of the power supply is in regulation*;
varying the frequency of the drive signal without skipping cycles in response to the feedback signal for a second range of feedback signal values *when the power supply output is in regulation; and*
*controlling both the frequency of the drive signal and a maximum duty cycle of the power switch with an oscillator circuit of a controller of the power supply.*

30. *The switching regulator of claim 1 wherein a lowest switching frequency of the switching regulator is above a human audible frequency range.*

31. *A switching regulator, comprising:*
*a power switch coupled between first and second terminals, the first terminal to be coupled to an energy transfer element of a power supply and the second terminal to be coupled to a supply rail of the power supply; and*
*a control circuit coupled to a third terminal and the power switch, the third terminal to be coupled to an output of the power supply, the control circuit coupled to generate a feedback signal responsive to the output of the power supply, the control circuit coupled to switch the power switch in response to the feedback signal, the control circuit coupled to switch the power switch at a fixed switching frequency for a first range of feedback signal values, the control circuit coupled to vary a switching frequency of the power switch without skipping cycles in response to the feedback signal for a second range of feedback signal values, wherein the control circuit comprises:*
  *a feedback signal circuit coupled to the third terminal, the feedback signal circuit coupled to generate the feedback signal; and*
  *a pulse width modulator circuit coupled to switch the power switch in response to the feedback signal,*
  *wherein the first and second ranges of the feedback signal correspond to first and second ranges of on-time values of a drive signal generated by the pulse width modulator circuit to switch the power switch.*

32. *The switching regulator of claim 31 wherein the first and second ranges of the feedback signal further correspond to first and second ranges of duty cycle percentage values of the drive signal generated by the pulse width modulator circuit to switch the power switch.*

33. *The switching regulator of claim 31 wherein a lowest switching frequency of the switching regulator is above a human audible frequency range.*

34. *A switching regulator, comprising:*
*a power switch coupled between first and second terminals, the first terminal to be coupled to an energy transfer element of a power suply and the second terminal to be coupled to a supply rail of the power supply; and*
*a control circuit coupled to a third terminal and the power switch, the third terminal to be coupled to an output of the power supply, the control circuit coupled to generate a feedback signal responsive to the output of the power supply, the control circuit coupled to switch the power switch in response to the feedback signal, the control circuit coupled to switch the power switch at a fixed switching frequency for a first range of feedback signal values, the control circuit coupled to vary a switching frequency of the power switch without skipping cycles in response to the feedback signal for a second range of feedback signal values, wherein the control circuit comprises:*
  *a feedback signal circuit coupled to the third terminal, the feedback signal circuit coupled to generate the feedback signal; and*
  *a pulse width modulator circuit coupled to switch the power switch in response to the feedback signal, and wherein on-time and off-time values of a drive signal generated by the pulse width modulator circuit to switch the power switch vary simultaneously as a* function of a level of a load coupled to the output of the power supply to vary the switching frequency of the power switch without skipping cycles for the second range of feedback signal values.

35. The switching regulator of claim 34 wherein the off-time value of the drive signal is varied as a function of the on-time value and a first on-time value of the drive signal, the first on-time value of the drive signal corresponding to an on-time of the drive signal at a boundary between the first and second ranges of feedback signal values.

36. The switching regulator of claim 34 wherein the switching frequency of the power switch is reduced without skipping cycles to a minimum frequency when a duty cycle percentage value of the drive signal generated by the pulse width modulator circuit to switch the power switch is substantially equal to zero percent.

37. The switching regulator of claim 34 wherein a lowest switching frequency of the switching regulator is above a human audible frequency range.

38. A switching regulator, comprising:
a power switch coupled between first and second terminals, the first terminal to be coupled to an energy transfer element of a power supply and the second terminal to be coupled to a supply rail of the power supply; and
a control circuit coupled to a third terminal and the power switch, the third terminal to be coupled to an output of the power supply, the control circuit coupled to generate a feedback signal responsive to the output of the power supply, the control circuit coupled to switch the power switch in response to the feedback signal, the control circuit coupled to switch the power switch at a fixed switching frequency for a first range of feedback signal values, the control circuit coupled to vary a switching frequency of the power switch without skipping cycles in response to the feedback signal for a second range of feedback signal values, wherein the first and second ranges of the feedback signal correspond to first and second ranges of on-time values of a drive signal generated by the control circuit to switch the power switch.

39. The switching regulator of claim 38 wherein the first and second ranges of the feedback signal further correspond to first and second ranges of duty cycle percentage values of the drive signal generated by the control circuit to switch the power switch.

40. The switching regulator of claim 38 wherein the control circuit comprises an oscillator circuit for controlling both the switching frequency and a maximum duty cycle of the power switch.

41. The switching regulator of claim 38 wherein a lowest switching frequency of the switching regulator is above a human audible frequency range.

42. A switching regulator, comprising:
a power switch coupled between first and second terminals, the first terminal to be coupled to an energy transfer element of a power supply and the second terminal to be coupled to a supply rail of the power supply; and
a control circuit coupled to a third terminal and the power switch, the third terminal to be coupled to an output of the power supply, the control circuit coupled to generate a feedback signal responsive to the output of the power supply, the control circuit coupled to switch the power switch in response to the feedback signal, the control circuit coupled to switch the power switch at a fixed switching frequency for a first range of feedback signal values, the control circuit coupled to vary a switching frequency of the power switch without skipping cycles in response to the feedback signal for a second range of feedback signal values, wherein on-time and off-time values of a drive signal generated by the control circuit to switch the power switch vary simultaneously as a function of the feedback signal in the second range of feedback signal values.

43. The switching regulator of claim 42 wherein the off-time value of the drive signal is varied as a function of the on-time value and a first on-time value of the drive signal, the first on-time value of the drive signal corresponding to an on-time of the drive signal at a boundary between the first and second ranges of feedback signal values.

44. The switching regulator of claim 42 wherein the switching frequency of the power switch is reduced without skipping cycles to a minimum frequency when a duty cycle percentage value of the drive signal generated by the control circuit to switch the power switch is substantially equal to zero percent.

45. The switching regulator of claim 42 wherein the control circuit comprises an oscillator circuit for controlling both the switching frequency and a maximum duty cycle of the power switch.

46. The switching regulator of claim 42 wherein a lowest switching frequency of the switching regulator is above a human audible frequency range.

47. A switching regulator, comprising:
a power switch coupled between first and second terminals, the first terminal to be coupled to an energy transfer element of a power supply and the second terminal to be coupled to a supply rail of the power supply;
a control circuit coupled to a third terminal and the power switch, the third terminal to be coupled to an output of the power supply, the control circuit coupled to generate a feedback signal responsive to the output of the power supply, the control circuit coupled to switch the power switch in response to the feedback signal; and
an oscillator circuit included in the control circuit for controlling both a switching frequency and an on-time of the power switch,
wherein the control circuit is coupled to switch the power switch at a fixed switching frequency for a first range of feedback signal values when the output of the power supply is in regulation, and wherein the control circuit is coupled to vary a switching frequency of the power switch without skipping cyles in response to the feedback signal for a second range of feedback signal values when the output of the power supply is in regulation.

48. The switching regulator of claim 47 wherein a lowest switching frequency of the switching regulator is above a human audible frequency range.

49. The switching regulator of claim 47 wherein the first and second ranges of the feedback signal correspond to first and second ranges of on-time values of a drive signal generated by the control circuit to switch the power switch.

50. A switching regulator, comprising:
a single power switch to be coupled between first and second terminals, the first terminal to be coupled to an energy transfer element of a power supply and the second terminal to be coupled to a supply rail of the power supply;
a control circuit coupled to a third terminal of the switching regulator and to the single power switch, the third terminal to be coupled to an output of the power supply, the control circuit coupled to generate a feedback signal responsive to the output of the power supply, the control circuit coupled to switch the power switch in response to the feedback signal, the control circuit coupled to switch the power switch at a fixed switching frequency for a first range of feedback signal values when the output of the power supply is in regulation, the control circuit coupled to vary a switching frequency of the power switch without skipping cycles in response to the feedback signal for a second range of feedback signal values when the power supply output is in regulation, wherein the control circuit comprises an oscillator circuit for controlling both the switching frequency and a maximum duty cycle of the power switch.

51. The switching regulator of claim 50 wherein a lowest switching frequency of the switching regulator is above a human audible frequency range.

52. The switching regulator of claim 50 wherein the first and second ranges of the feedback signal correspond to first and second ranges of on-time values of a drive signal generated by the control circuit to switch the power switch.

\* \* \* \* \*